Jan. 4, 1955
E. H. HUGENHOLTZ
2,698,904
FREQUENCY-STABILIZING ARRANGEMENT
Filed May 9, 1951
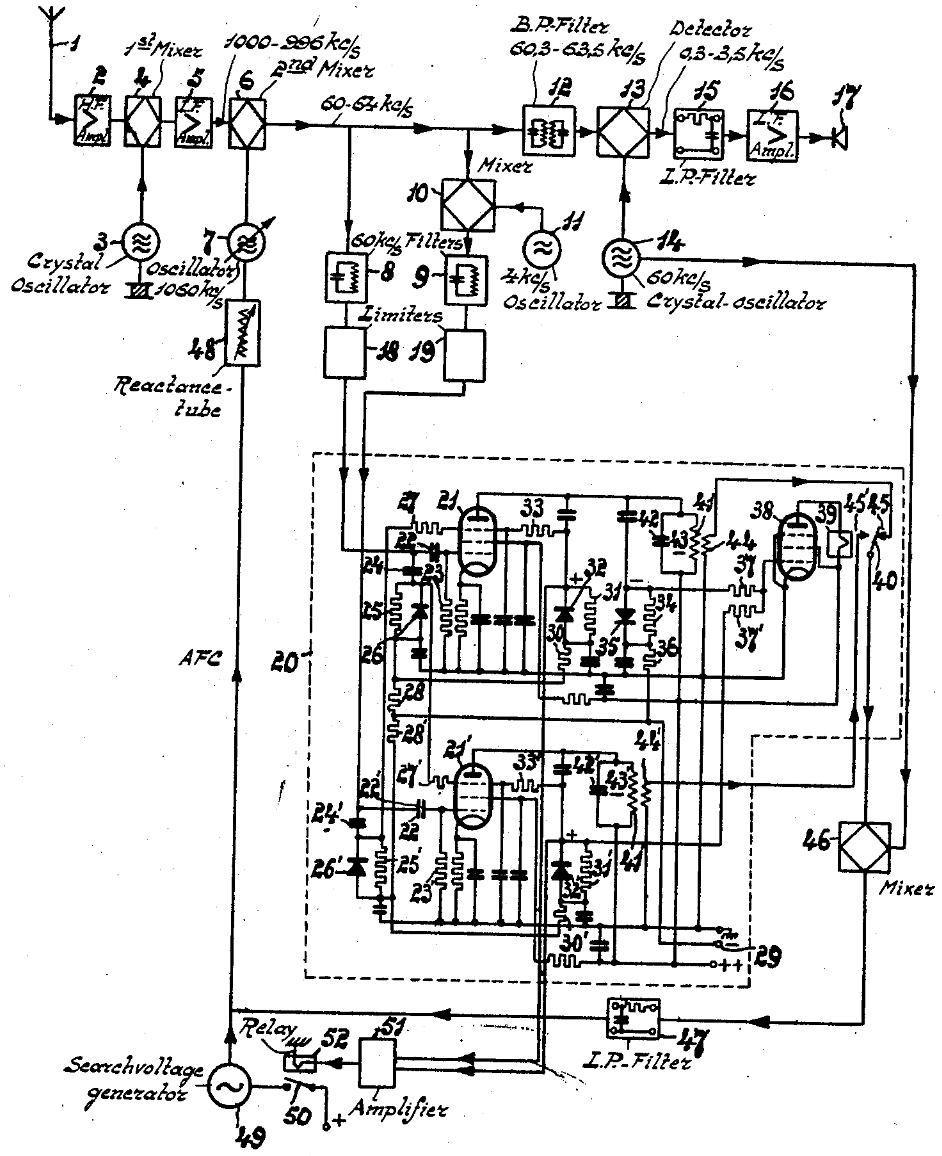
INVENTOR.
EDUARD HERMAN HUGENHOLTZ
BY Fred M Vogel
AGENT

1

2,698,904

FREQUENCY-STABILIZING ARRANGEMENT

Eduard Herman Hugenholtz, Hilversum, Netherlands, assignor to Hartford National Bank and Trust Company, Hartford, Conn., as trustee Application May 9, 1951, Serial No. 225,418

Claims priority, application Netherlands June 27, 1950

5 Claims. (Cl. 250—36)

This invention relates to frequency-stabilizing arrangements for automatic frequency-correction of a local oscillator by means of a pilot or control frequency.

In arrangements of this kind, the frequency and/or phase difference between the pilot frequency and the oscillator and the oscillator frequency to be corrected acts upon a frequency and/or phase comparison device to produce a control voltage, said control voltage controlling a frequency corrector correcting the oscillator frequency.

Such arrangements are used for automatic stabilization of the frequency and/or phase of a transmitter output or for automatic correction of the frequency of the local oscillator of a superheterodyne receiver, for example, a single side-band-receiver, so as to develop the desired intermediate-frequency.

To avoid failure of automatic stabilization because of the pilot frequency falling without the catching range of the circuit, it has previously been suggested that the tuning of the generator in the unstabilized condition should be varied automatically in a low-frequency rhythm, for example, with the use of a search voltage generator, until stabilization occurs. In this case either the sweep voltage is suppressed or the search-voltage generator is switched off.

However, it is not impossible that after temporary disappearance of the pilot frequency or after temporary equipment failure, an interference signal instead of the desired pilot frequency will stabilize the circuit.

The object of the invention is to mitigate this disadvantage in stabilizing arrangements of the kind above described.

According to the invention, for this purpose the stabilizing arrangement comprises two pilot-frequency selectors for selecting pilot frequencies exhibiting a given frequency difference, the output voltages of said selectors jointly suppressing the search voltage upon simultaneous occurrence of these pilot frequencies, while the pilot-frequency derived from one pilot-frequency selector is supplied as a stabilizing frequency to the means for frequency-correction of the local oscillator.

In one preferred embodiment according to the invention, the output circuits of the first and second pilot-frequency selectors are coupled to a first and a second rectifier and a first and a second amplifying tube, a grid circuit of which includes a source of negative grid-bias which cuts off the amplifying tube, the said grid circuits of the first and second tubes being connected to the output circuits of the second and the first rectifier, respectively. These rectifiers supply a positive grid-bias counteracting the negative grid-bias. The output circuits of the first and second amplifying tubes include a third and a fourth rectifier, respectively, the summated output voltages of which make the search voltage generator inoperative when a given threshold value is exceeded.

In the arrangement according to the invention, if the pilot frequency disappears or if the amplitude of one of the pilot frequencies is insufficient for the required stabilization, it is furthermore possible in a simple manner to change over the stabilization to the other pilot frequency.

The invention will now be explained more fully by reference to the accompanying drawing showing, by way of example, one embodiment of a single side-band-receiver comprising a frequency-stabilizing arrangement according to the invention. For the sake of simplicity, circuit elements known per se in different forms or at least previously suggested are shown in block form.

A single-side-band signal with suppressed carrier wave

2 received by an aerial 1 and containing not only the intelligence signals but also two pilot frequencies located above and below the signal band, is mixed after being amplified in a high-frequency stage 2, with the signal originating from a crystal-controlled oscillator 3, in a mixing stage 4. The intermediate-frequency signal obtained after mixture, the frequencies of which extend, for example, between 1000 and 996 kcs./s. and in which the frequencies 1000 and 996 kcs./s. represent a 60 kcs./s. and 64 kcs./s. pilot-frequency, respectively, is mixed after intermediate-frequency amplification 5 in a second mixing stage 6 with an oscillation of 1060 kcs./s., generated by a local oscillator 7 which is subject to automatic frequency control.

The single side-band signal occurring across the output circuit of the mixing stage 6 and extending, after the twofold transposition, through a range of frequencies between 60 and 64 kcs./s., is supplied to a first pilot-frequency selector 8, constituted by a band-pass filter tuned to 60 kcs./s. and a second pilot-frequency selector. The second pilot-frequency selector comprises a mixing stage 10 connected to the input circuit of a filter 9 likewise tuned to 60 kcs./s. and a local oscillator 11 tuned to 4 kcs./s. Consequently, the first and second pilot-frequencies become 60 and 64 kcs./s. Furthermore, the intermediate-frequency signal derived from the mixing stage 6 is supplied by way of a band-pass filter 12, which only allows the passage of frequencies between 60.3 and 63.5 kcs./s., to a demodulator 13. A local oscillator signal of 60 kcs./s. originating from a crystal-controlled standard oscillator 14, is supplied to the demodulator 13, the low-frequency signals (0.3 to 3.5 kcs./s.) occurring across the output circuit of the demodulator being supplied by way of a low-pass filter 15 and a low-frequency amplifier 16 to a reproducing device 17.

The pilot frequencies derived from the pilot-frequency selectors 8 and 9 to 11 are supplied by way of limiters 18 and 19, respectively, to a device 20.

The device 20, of which a detailed diagram is shown, comprises two pentodes 21, 21' connected as amplifying tubes. The control grids of these tubes receive through grid condensers 22, 22' and leak resistances 23, 23', respectively, pilot frequencies which are derived from the limiters 18 and 19, respectively, and which now both have a frequency of 60 kcs./s. The cathodes of the tubes 21, 21' are grounded by way of cathode resistances shunted by capacitors, the screen grids of said tubes being coupled by way of series resistances and grounded decoupling capacitors to the source of anode voltage. The control-grid circuit of tube 21 and the control-grid circuit of tube 21' include rectifiers 26, 26', respectively, connected by way of a capacitor 24, 24', respectively, to the circuits of the respective limiters 18 and 19, said limiters being shunted by resistors 25 and 25'. The point of connection between the cathode of rectifier 26 and capacitor 24 is coupled through resistor 27' to the suppressor grid of tube 21', whereas the point of connection between the cathode or rectifier 26' and capacitor 24' is coupled through resistor 27 to the suppressor grid of tube 21. The anodes of the rectifiers 26, 26' are capacitively grounded and are connected to a negative grid-bias source 29 by way of a voltage divider including resistors 28, 28'. The anodes of the rectifiers 26, 26' are connected through resistances 30, 30' to the anodes of rectifiers 32 and 32', included in the output circuits of the pentodes 21, 21' and shunted by resistors 31, 31'. The cathodes of the rectifiers 32, 32' are capacitively connected to the anodes of the tubes 21, 21', respectively, and by way of resistors 33, 33' to the suppressor grids of the tubes 21, 21'. The anode circuit of tube 21 includes an additional rectifier 35 shunted by a resistor 34, the anode of which is capacittively coupled to the anode of tube 21, the cathode of rectifier 35 being connected by way of a resistor 36 to the negative grid-bias source 29. The anode of rectifier 35 is also connected to the control-grid of an amplifying tube 38 through resistor 37. The control grid is connected by way of a resistor 37' to the cathode of the rectifier 32' included in the anode circuit of tube 21'. The anode circuit of tube 38 includes a relay 39 having a change-over contact 40.

The anode circuits of the tubes 21, 21' include tank circuits 43 and 43', respectively, constituted by inductances 41, 41′ and capacitors 42, 42′ connected in parallel therewith and tuned to 60 kcs./s. The output oscillations derived from the oscillatory circuits 43, 43′ through coupling coils 44, 44′ are supplied to contacts 45 and 45′ and through the change-over contact 40 to a phase-comparison device 46, constituted by a mixing stage. The device compares the frequency and phase of these output oscillations with the 60 kcs./s. oscillations supplied to device 46 from the standard oscillator 14.

The mixing-stage 46 supplies a control-voltage which, upon stabilization (i. e., isochronism of the two applied oscillations), is substantially constituted by a direct voltage and otherwise by an alternating voltage corresponding to the difference frequency between the oscillations compared. This control voltage is supplied by way of a low-pass filter 47 to a reactance tube 48 which is coupled to the oscillator 7 which is to be stabilized in frequency.

Furthermore, the arrangement comprises a search voltage generator 49, fed through a switch 50 from a high-tension source, the output voltage of which is supplied to the control-voltage lead provided between the variable reactance 48 and the low-pass filter 47. The switch 50 is operated by a relay 52 included in the anode circuit of an amplifying tube 51 having a negative bias. The tube 51 conveys anode current as soon as the summated output volatges of the direct voltages occurring across the rectifiers 32, 32′ exceed a given threshold value, the said tubes thus energizing the relay 52 with the result that the generator is rendered inoperative.

The operation of the described frequency-stabilizing arrangement according to the invention is as follows: Starting from the position in which pilot frequencies of 60 and 64 kcs./s., respectively, are derived with sufficient amplitudes from mixing stage 6, the influence of the negative bias originating from the grid-bias source 29 upon the suppressor grids of the tubes 21, 21′, is compensated for by the positive biasing potentials then occurring across the rectifiers 26, 26′ and supplied to the suppressor grids of the tubes 21′ and 21, respectively. The pilot frequencies supplied to the tubes 21, 21′ appear across the anode circuits of said tubes and are supplied to the rectifiers 32, 32′, which also provide positive voltages supplied to the suppressor grids of the tubes 21, 21′ and which keep the tube concerned in the conducting state so long as an input signal is supplied to it. Furthermore, the summated output voltages of the rectifiers 32, 32′ supplied by way of an amplifier 51 and relay 52, render generator 49 inoperative, the generator otherwise remaining operative as long as the two pilot frequencies do not occur with a given frequency difference.

If the two pilot frequencies appear in the anode circuits of the tubes 21, 21′ with an amplitude sufficient for stabilization, the control grid of tube 38 has supplied to it, in addition to a negative bias provided by rectifier 35, a positive bias provided by rectifier 32′. This positive bias is insufficient to render tube 38 conductive. The relay 39 is then not energized and the change-over contact occupies the position as shown. The pilot-frequency signal of 60 kcs./s. appearing across the oscillatory circuit 43 included in the anode circuit of tube 21 is supplied by way of contact 45 and change-over contact 40 to the comparison mixing stage 46 and compared therein with the signal of 60 kcs./s. derived from the standard oscillator 14. The AFC control voltage occurring across the output circuit of the mixing stage 46 is supplied for stabilizing the frequency of the local oscillator 7 (1060 kcs./s.) by way of low-pass filter 47 to the variable reactance 48.

If, for example, the pilot frequency of 60 kcs./s. temporarily disappears due to fading and if the pilot frequency of 64 kcs./s. only is received with an amplitude sufficient for the required stabilization, the tube 21 does not provide an output voltage but remains conducting as a result of the positive grid-bias across the rectifier 26′. This bias is supplied to the suppressor grid of tube 21 and counteracts the negative grid-bias of source 29. The rectifier 32 now does not supply output voltage, but by suitable adjustment of tube 51 and relay 52, the generator 49 remains inoperative. Due to the absence of the 60 kcs./s. pilot frequency, the blocking negative bias for tube 38, provided by rectifier 36, disappears, whereafter the positive bias of rectifier 32′ releases tube 38. The relay 39 is now energized and the change-over contact 40 comes on contact 45′. The voltage of a frequency of 60 kcs./s. occurring across the anode circuit of tube 21′ is then supplied by way of change-over contact 40 to the mixing stage 46 and compared therein with the frequency of the oscillations of 60 kcs./s. derived from the local standard oscillator 14. The local oscillator 7 is now stabilized by the pilot frequency supplied to the tube 21′.

If both pilot frequencies disappear, both tubes 21 and 21′ are cut off. No voltages then occur across the rectifiers 32 and 32′ which can cut off tube 51. The relay 52 is de-energized and the generator 49 becomes operative and supplies a voltage of low frequency, for example, 3 c./s., to the variable reactance 48, so that the frequency of the local oscillator 7 is automatically varied in a low-frequency rhythm until the two pilot frequencies exhibiting a given frequency difference occur with amplitudes sufficient for stabilization across the output circuits of the pilot frequency selectors 8, 9, whereafter the searching-voltage generator, as explained in the foregoing, becomes inoperative due to the device 20 becoming operative.

If change-over of stabilization by means of change-over contact 40 from the one pilot frequency to the other is not required, the device 20 may be simplified by removing the amplifier 21′, 23′, the rectifier 30, 32′, the amplifier 38 and the relay 39. The tube 51 and the relay 52 may in this case be controlled by the positive potentials derived from the rectifiers 30, 31 and 24′, 26′.

If the pilot-frequency supplied to tube 21 appears, stabilization will not occur and the generator will become operative until the two pilot frequencies again occur simultaneously across the output circuits of the selectors 8, 9, then the generator becomes inoperative. If, however, the pilot frequency of 64 kcs./s. disappears and that of 60 kcs./s. remains, stabilization by the last-mentioned pilot frequency is maintained.

What I claim is:

1. Apparatus for maintaining, within a predetermined catching range, a first voltage produced by a local oscillator in isochronism with a second voltage produced by a reference oscillator, said apparatus comprising means coupled to said local oscillator to combine said first voltage with an input wave to produce a beat wave, selective means to derive from said beat wave first and second pilot frequency voltages having a predetermined frequency difference, a phase discriminator responsive to said second voltage and one of said pilot frequency voltages to produce a control voltage depending on the difference therebetween, a reactance tube coupled to said local oscillator, means to apply said control voltage to said reactance tube for maintaining said isochronism, a search voltage generator producing a search voltage for swinging said local oscillator within said predetermined catching range, means to apply said search voltage to said reactance tube, means responsive solely to the co-existence of said first and second pilot frequency voltages and coupled to said generator for suppressing said search voltage; whereby said search voltage is always present in the absence of one of said first and second pilot frequency voltages and is suppressed whenever said first voltage falls within said predetermined catching range.

2. Apparatus for maintaining, within a predetermined catching range, a first voltage produced by a local oscillator in isochronism with a second voltage produced by a reference oscillator, said apparatus comprising means coupled to said local oscillator to combine said first voltage with an input wave to produce a beat wave, means to derive from said beat wave first and second pilot frequency voltages having a predetermined frequency difference, a phase discriminator responsive to said second voltage and one of said pilot frequency voltages to produce a control voltage depending on the difference therebetween, a reactance tube coupled to said local oscillator, means to apply said control voltage to said reactance tube for maintaining said isochronism, a search voltage generator producing a search voltage for swinging said local oscillator within said predetermined catching range, means to apply said search voltage to said reactance tube, first and second amplifying stages, the input circuits of said stages each including a first rectifier having a conduction characteristic at which a positive bias is produced and further including a source of negative bias having a value at which said stages will be rendered inoperative in the absence of any positive bias, means to supply said first and second pilot frequency voltages to the respective input circuits of said first and second amplifying stages, means responsive to the summation of said amplified first and second pilot frequency voltages and coupled to said generator for suppressing said search voltage when said summation exceeds a predetermined threshold value; whereby said search voltage is always present in the absence of one of said first and second pilot frequency voltages and is suppressed whenever said voltage falls within said predetermined catching range.

3. Apparatus as set forth in claim 2, wherein the output circuit of each of the first and second amplifying stages includes a second rectifier and wherein the input circuit of each amplifying stage is coupled to its respective output circuit through said second rectifier, said second rectifier having a sense at which additional positive bias sufficient to prevent said stage from being rendered inoperative is supplied to said input circuit as long as the respective pilot frequency voltage does not fall below a predetermined magnitude.

4. Apparatus for maintaining, within a predetermined catching range, a first voltage produced by a local oscillator in isochronism with a second voltage produced by a reference oscillator, said apparatus comprising means coupled to said local oscillator to combine said first voltage with an input wave to produce a beat wave, selective means to derive from said beat wave first and second pilot frequency voltages having a predetermined frequency difference, a phase discriminator responsive to said second voltage and one of said pilot frequency voltages to produce a control voltage depending on the difference therebetween, a reactance tube coupled to said local oscillator, means to apply said control voltage to said reactance tube for maintaining said isochronism, a search voltage generator producing a search voltage for swinging said local oscillator within said predetermined catching range, means to apply said search voltage to said reactance tube, first and second amplifying stages, the input circuits of said stages each including a first rectifier having a conduction characteristic at which a positive bias is produced and further including a source of negative bias having a value at which said stages will be rendered inoperative in the absence of any positive bias, means to supply said first and second pilot frequency voltages to the respective input circuits of said first and second amplifying stages, means responsive to the summation of said amplified first and second pilot frequency voltages and coupled to said generator for suppressing said search voltage when said summation exceeds a predetermined threshold value, a switching device interposed between the output circuits of said amplifying stages and said phase discriminator, said device being operative in a first condition at which said discriminator is responsive to said first pilot frequency voltage when said first pilot frequency voltage exceeds a predetermined value and in a second condition at which said discriminator is responsive to said second pilot frequency voltage when said first pilot frequency falls below said predetermined value; whereby said search voltage is always present in the absence of one of said first and second pilot frequency voltages and is suppressed whenever said first voltage falls within said predetermined catching range.

5. Apparatus as set forth in claim 4, wherein said switching device includes a relay, said apparatus further including means to derive from the output circuits of said first and second amplifying states respective first and second direct voltages of opposing polarities, the magnitudes of said direct voltages determining the switching condition of said relay.

References Cited in the file of this patent

UNITED STATES PATENTS

| | | |
|---|---|---|
| 2,415,799 | Reifel et al. | Feb. 11, 1947 |
| 2,541,454 | White et al. | Feb. 13, 1951 |
| 2,561,041 | Arends et al. | July 17, 1951 |